3,004,599
METHOD AND APPARATUS FOR PLUGGING PERMEABLE FORMATIONS

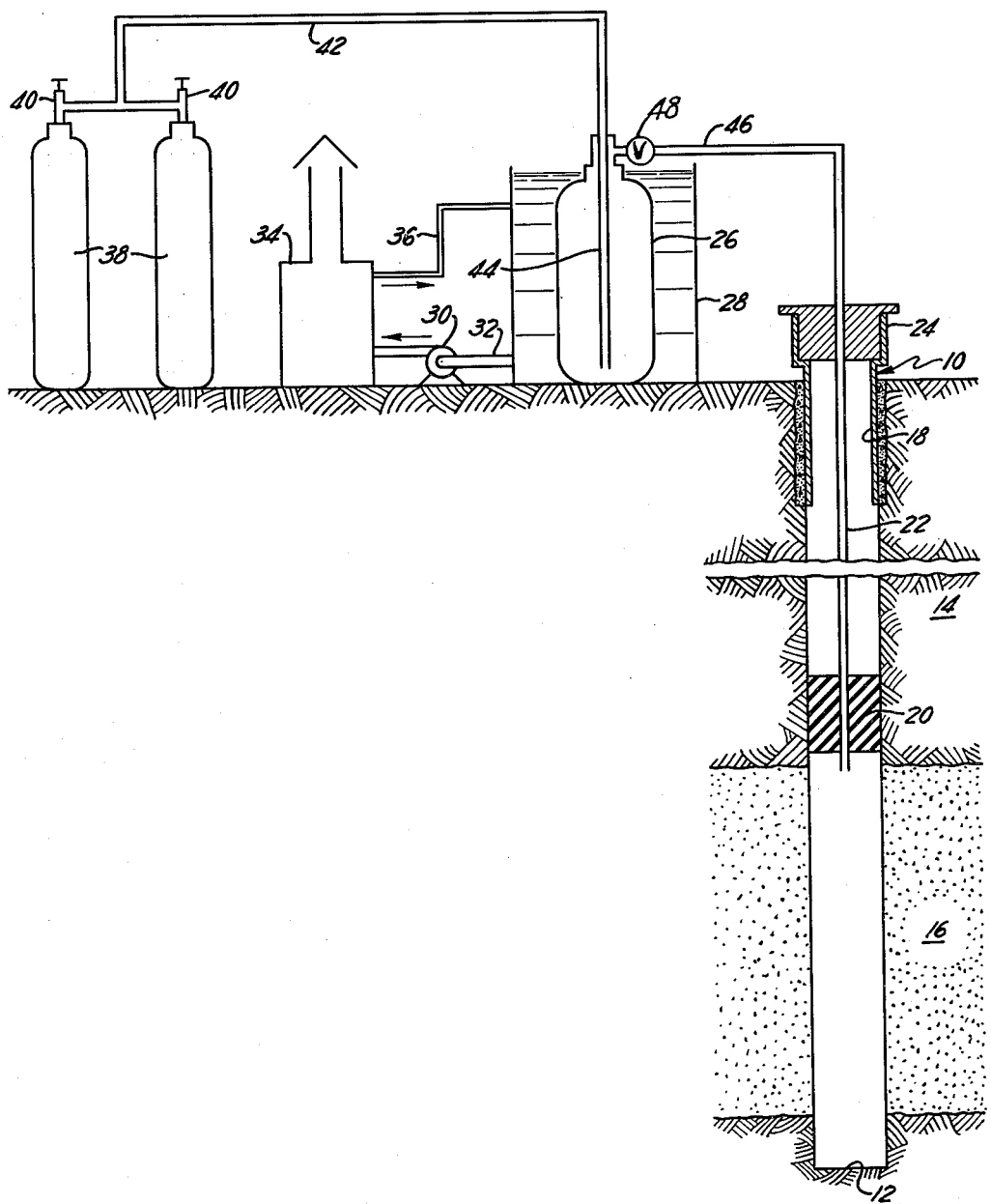

Robert J. Goodwin, Oakmont, and Abraham J. Teplitz, Pittsburgh, Pa., assignors to Gulf Research & Development Company, Pittsburgh, Pa., a corporation of Delaware
Filed May 12, 1958, Ser. No. 734,472
4 Claims. (Cl. 166—38)

This invention relates to the displacement of a reactant gas into a permeable formation and more particularly to a method and apparatus for controlling the partial pressure of a reactant gas to prevent its condensation when injected into a permeable formation.

Frequently, it is desirable to plug or reduce the permeability of formations penetrated by wells. For example, in one of the processes for the secondary recovery of oil, gas is injected into a formation at one well to drive oil to an adjacent production well through which it is lifted to the surface. Initially, the gas is usually effective in driving oil to the production well with a low gas oil ratio. After the gas repressuring has proceeded long enough to produce a substantial part of the oil, strata which are highly permeable to gas flow develop and a large part of the gas by-passes the oil in the formation and flows directly to the production well. It is desirable to at least partially plug the highly permeable strata to make the permeability of the formation more uniform and reduce the gas-oil ratio produced at the production well.

Another situation in which the reduction of the permeability of a formation is desirable occurs during the drilling of wells with a gas as a circulating medium. The gaseous circulating medium is pumped down through the drill pipe and up through the annulus in the borehole surrounding the drill pipe to carry cuttings from the hole. If water bearing formations are penetrated during the drilling, water may flow into the borehole and cause balling of the cuttings and thereby interfere with their removal from the hole. It is desirable to plug the water bearing formations to stop the flow of water into the hole to allow continued drilling with a gaseous circulating medium.

In our earlier application Serial No. 683,506, now abandoned, a process for plugging permeable formations is described in which an aqueous solution of aluminum sulfate is displaced into the formation and followed by the injection of gaseous ammonia. The ammonia reacts with the aqueous solution of aluminum sulfate to form a precipitate of aluminum hydroxide in place in the formation which effectively plugs the formation. It is important that the ammonia be gaseous. If a second liquid is injected after the aluminum sulfate solution the aluminum sulfate solution is merely displaced farther into the formation and little reaction to form aluminum hydroxide occurs. Usually the pressure existing in the formation will be higher than the vapor pressure of ammonia at the temperature of the formation. To prevent condensation of the ammonia a mixture of a permanent gas and ammonia is displaced into the formation whereby the ammonia reacts with aluminum sulfate.

This invention resides in a method for controlling the composition of a mixture of a reactant gas of relatively high boiling point and a permanent gas to prevent condensation of the gas at conditions of temperature and pressure encountered as it is used in plugging permeable formations penetrated by a well. A permanent gas is bubbled through the reactant gas maintained by temperature control means at a temperature slightly below the temperature of the formation and at a pressure high enough to liquefy the gas. The control of the temperature limits the partial pressure of the reactant gas in the mixture to a pressure lower than the vapor pressure of the reactant gas at the formation temperature. The mixture of permanent gas and gas of relatively high boiling point is discharged from above the liquid and displaced into the formation.

The single figure of the drawings is a diagrammatic illustration of apparatus for controlling the composition of the gaseous mixture and injecting it into a permeable formation.

This invention will be described for the plugging of a permeable formation by the injection of a solution of aluminum sulfate followed by the injection of ammonia in the gaseous state to form a precipitate of aluminum hydroxide. The invention is not so limited, however, and is useful whenever a reactant gas of relatively high boiling point is injected into a formation to react in place in the formation with a liquid. Examples of other systems that can be used are the injection of calcium chloride solution followed by carbon dioxide to form a calcium carbonate precipitate; the injection of a lead acetate solution followed by hydrogen sulfide to form a lead sulfide precipitate; and the injection of a barium chloride solution followed by sulfur trioxide to form a barium sulfate precipitate. The term "relatively high boiling point" used to describe the reactant gas is used only to designate gases having thermodynamic properties which may cause them to condense at conditions of temperature and pressure required to inject the gas into the formation. In some instances, the formation to be plugged may be relatively shallow and no problem of condensation of the reactant gas will be encountered. In other instances, the formation to be plugged may be so deep that the temperature existing in the formation is above the critical temperature of the reactant gas in which event no problem of condensation of the reactant gas is encountered. However, the properties of many reactant gases such as ammonia, carbon dioxide, hydrogen sulfide, sulfur dioxide, and sulfur trioxide are such that difficulties with condensation of the gas may be expected frequently. Some reactant gases, notably ammonia, will be liquid at the conditions existing in most subsurface formations which it may be desirable to plug.

The term "permanent gas" used in this specification designates gases having thermodynamic characteristics such that there is no danger of condensation at the conditions of temperature and pressure existing in the formation or required to displace the gas into the formation. In most instances the critical temperature of the gases will be well below any temperatures that will be encountered at any stage of the process. Suitable permanent gases are hydrocarbon gases such as natural gas, which is principally methane and may contain small amounts of ethane and propane, and many lease gases, as well as gases such as nitrogen and hydrogen. Air is also suitable for use as a permanent gas. In some instances mixtures of air and the reactant gas may form explosive mixtures which will necessitate care in handling the mixture to avoid sparks which may cause the mixture of gases to explode. Ordinarily, the permanent gas will be an inert gas insofar as the reaction occurring in the formation is concerned, but it is only necessary that the permanent gas not interfere with the reaction forming the precipitate.

For purpose of illustration, the process and apparatus of this invention for forming gaseous mixtures which will not condense at the conditions existing in the formation will be described in detail for a process to shut off water from a formation penetrated during the drilling of a well. Referring to the drawings, a well indicated generally by reference numeral 10 is drilled to a total depth 12. Well 10 extends downwardly through an upper formation 14 and a water bearing formation 16. Ordinarily a surface casing 18 is set in the upper end of the borehole.

In order to shut off water from formation 16 to permit further drilling, the formation 16 is preferably isolated by a packer 20 set in the borehole directly above the formation 16 and tubing 22 run through the packer from the well head. Tubing 22 is suspended from the upper end of the well by any suitable arrangement such as a tubing hanger 24. It may be desirable to treat the entire exposed borehole wall, in which event it will not be necessary to set the packer 20. The closure at the top of the well, for example tubing hanger 24, allows the borehole to be placed under pressure sufficient to displace the aqueous solution and gas mixture into the formation. If a limited intermediate section of the borehole is to be treated, straddle packers can be set to isolate that section.

A container 26 of the reactant gas under pressure higher than the pressure in formation 16 maintaining the reactant gas in the liquid phase is placed in a temperature control tank 28 at the ground surface adjacent the well. Temperature control tank 28 contains a liquid covering the container 26 to transfer heat to or from the container. A pump 30 withdraws the liquid from the tank 28 and circulates it through a fired heater 34 and a line 36 to the temperature control tank 28. The temperature control for container 26 can be any temperature control system. For example, an electric heating coil could be wrapped around the container 26 to supply the heat required to maintain the container at the desired temperature.

The permanent gas used to dilute the reactant gas to maintain its partial pressure below the vapor pressure of the reactant gas at the temperature in the formation 16 is supplied in the embodiment illustrated in the drawings by cylinders 38 of nitrogen under pressure. If lease gas is available, it is a preferred permanent gas. A compressor, not shown, may be required to increase the pressure on the permanent gas. The cylinders are provided with suitable valves 40 at their upper end in accordance with the normal construction of cylinders. A line 42 is connected with the outlets of the cylinders for delivery of the nitrogen to a bubbler line 44 extending down into container 26 and ending shortly above the bottom of the cylinder. An outlet at the upper end of the container above the liquid level is connected to a delivery line 46 through which the mixture of gases is delivered to the upper end of tubing 22. A valve 48 in line 46 allows control of the rate of flow of the mixture of gases into the tubing 22 and formation 16.

Ordinarily the temperature existing in the formation to be plugged can be estimated with sufficient accuracy from the known thermal gradient in that area. If the well should be located where there is some doubt about the pressure and temperature in the formation to be plugged, a survey of the well can be made to determine the temperature and pressure of the formation. The temperature in the constant temperature tank 28 is then raised to a temperature slightly below the temperature in the formation 16. The supply line for the aqueous solution of aluminum sulfate is connected to the upper end of tubing 22 and the required amount of aqueous aluminum sulfate solution is displaced down through tubing 22 into formation 16. The aqueous solution is displaced from the borehole with an inert gas.

The apparatus is then connected in the manner illustrated in the drawings with line 46 connected to the upper end of tubing 22. Nitrogen is discharged from the cylinders 38 into line 42, discharged from the lower end of bubbler 44 and bubbled up through the liquid ammonia in container 26. The mixture of nitrogen and gaseous ammonia is discharged through the outlet at the upper end of the container into delivery line 46. The rate at which the gaseous mixture is discharged from the container 26 is controlled by valve 48. The mixture of the nitrogen and ammonia is displaced into the formation 16 and fingers its way through the aqueous solution of aluminum sulfate to form a precipitate of aluminum hydroxide in place in the formation. Upon completion of the injection of ammonia and release of the pressure in the borehole, the precipitate of aluminum hydroxide closes the channels through the formation to prevent flow of water into the borehole. If a single treatment of the type described does not completely plug the formation the sequence of steps may be repeated as often as necessary to make a complete shut off.

Maintaining the temperature of the ammonia in container 26 lower than the temperature of the formation 16 assures a partial pressure of ammonia in the gaseous mixture lower than the vapor pressure of ammonia at the temperature of the formation regardless of the total pressure on the gaseous mixture at the well head. It is probable that equilibrium between the permanent gas, nitrogen in the example, and the reactant gas, ammonia in the example, is not reached in container 26. For this reason, the temperature in the constant temperature bath 28 may be as high as the temperature in the formation 16. It is preferred that the temperature in the constant temperature bath 28 and container 26 be in the range from about 20° below the temperature of the formation up to the temperature of the formation.

This invention is useful whenever a reactant gas of relatively high boiling point is injected into a formation to react in place in the formation with a liquid. In most instances the liquid will be an aqueous solution of a metal salt which on reaction with the reactant gas forms an insoluble deposit or precipitate. Forming a mixture of the reactant gas with a permanent gas by bubbling the permanent gas through liquefied reactant gas maintained at a temperature not higher than the formation temperature effectively prevents condensation of the reactant gas in the formation.

We claim:

1. A method of plugging a permeable formation penetrated by a well comprising displacing an aqueous solution of a metal salt capable of reacting with a reactant gas to form a precipitate into the formation, maintaining the reactant gas in the liquid state at the well head at a temperature in the range from slightly below up to the temperature in the formation and a pressure higher than the pressure in the formation, then bubbling a permanent gas through the liquefied reactant gas to form a gaseous mixture of the permanent gas and the reactant gas, and displacing the mixture of the reactant gas and permanent gas into the formation whereby the reactant gas reacts with the metal salt to form a precipitate in the portion of the formation.

2. A method as set forth in claim 1 in which the metal salt is aluminum sulfate and the reactant gas is ammonia.

3. A process as set forth in claim 1 in which the metal salt is calcium chloride and the reactant gas is carbon dioxide.

4. In a process for displacing a reactant gas of relatively high boiling point into a permeable subsurface formation penetrated by the borehole of a well and under a pressure higher than the vapor pressure of the gas at the temperature of the formation for reaction with a liquid present in the formation, the method of controlling the partial pressure of the reactant gas in a gaseous mixture displaced into the formation to prevent condensation of the gas in said subsurface formation comprising maintaining said reactant gas at the well head at a temperature lower than the temperature of the formation and a pressure higher than the pressure of the formation which is adapted to place the reactant gas in the liquid state, passing a permanent gas through said liquefied reactant gas to form a gaseous mixture of the permanent gas and said reactant gas, separating said mixture from the remaining liquefied reactant gas, and displacing said separated mixture down the well and into the permeable subsurface formation.

References Cited in the file of this patent

UNITED STATES PATENTS

| | | |
|---|---|---|
| 1,421,706 | Mills | July 4, 1922 |
| 1,815,826 | Muller | July 21, 1931 |
| 2,029,649 | Ayres | Feb. 4, 1936 |
| 2,164,718 | Norman | July 4, 1939 |
| 2,272,672 | Kennedy | Feb. 10, 1942 |
| 2,361,012 | Cole et al. | Oct. 24, 1944 |
| 2,363,715 | Wells | Nov. 28, 1944 |
| 2,800,184 | Meadors | July 23, 1957 |
| 2,837,163 | Ramos et al. | June 3, 1958 |

UNITED STATES PATENT OFFICE

CERTIFICATE OF CORRECTION

Patent No. 3,004,599 October 17, 1961

Robert J. Goodwin et al.

It is hereby certified that error appears in the above numbered patent requiring correction and that the said Letters Patent should read as corrected below.

Column 5, line 7, for "1,815,826" read -- 1,815,876 --.

Signed and sealed this 17th day of April 1962.

(SEAL)
Attest:

ESTON G. JOHNSON

Attesting Officer

DAVID L. LADD

Commissioner of Patents